Figure 1:
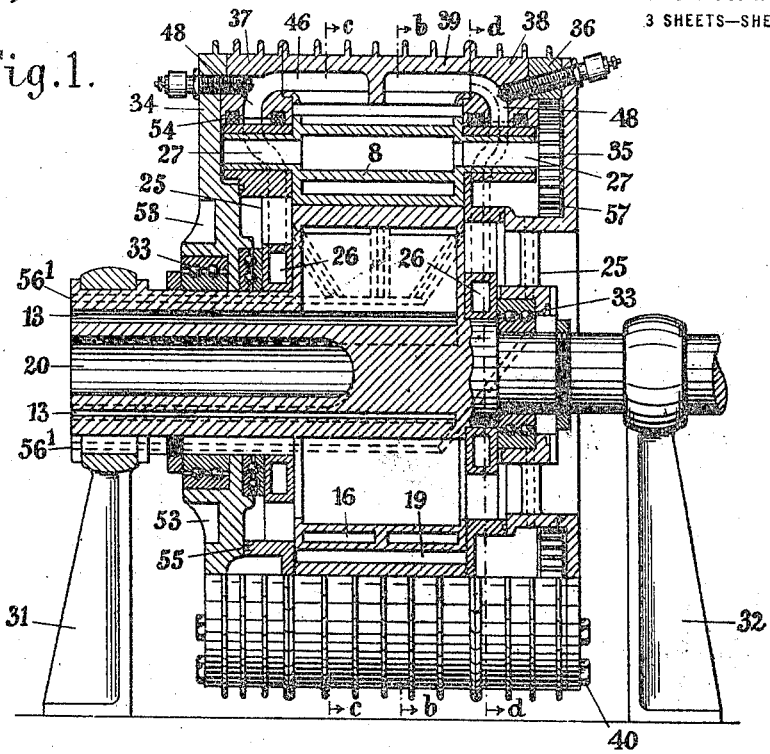

B. CONKLIN.
INTERNAL COMBUSTION ROTARY ENGINE.
APPLICATION FILED MAR. 10, 1917.

1,294,771.

Patented Feb. 18, 1919.
3 SHEETS—SHEET 1.

Bruce Conklin
Inventor
by
Attorney

B. CONKLIN.
INTERNAL COMBUSTION ROTARY ENGINE.
APPLICATION FILED MAR. 10, 1917.

1,294,771.

Patented Feb. 18, 1919.
3 SHEETS—SHEET 2.

Bruce Conklin
Inventor
by Laurence Langer
Attorney

B. CONKLIN.
INTERNAL COMBUSTION ROTARY ENGINE.
APPLICATION FILED MAR. 10, 1917.

1,294,771. Patented Feb. 18, 1919.
3 SHEETS—SHEET 3.

Bruce Conklin
Inventor
by Laurence Langner
Attorney

UNITED STATES PATENT OFFICE.

BRUCE CONKLIN, OF LONDON, ENGLAND.

INTERNAL-COMBUSTION ROTARY ENGINE.

1,294,771.           Specification of Letters Patent.       Patented Feb. 18, 1919.

Application filed March 10, 1917.  Serial No. 153,904.

*To all whom it may concern:*

Be it known that I, BRUCE CONKLIN, a citizen of the United States of America, residing at London, in the county of Middlesex, England, have invented a new and useful Improvement in Internal-Combustion Rotary Engines, of which the following is a specification.

This invention has reference to internal combustion rotary engines of the kind in which an inner stationary element or drum and an outer rotating element or casing are respectively provided with a plurality of rotary abutments and a plurality of vanes and in which the drum and casing are mounted concentrically in relation to each other so as to afford an intervening annular space which constitutes the working chamber of the engine rotary or other valve mechanism being ordinarily employed for transferring the charge of compressed working fluid to the explosion chamber.

The primary objects of the invention are to insure the introduction of the working charge into the explosion chamber at full working pressure to effect the induction and compression of the working fluid and the exhaust of the products of combustion without the employment of positively actuated valve mechanism to insure the efficient cooling of the engine and generally to improve the operation and efficiency of the engine as a whole.

With these and such other objects as may hereinafter appear, or are incidental to the ends in view, the invention in its broadest aspect may be said to comprise an internal combustion rotary engine in which the compression and firing alternate at diametrically opposite points of the inner element or drum. The rotary abutments and vanes are so disposed, relatively to each other, as to cause the working fluid to be compressed alternately from two diametrically opposite points of the drum, into a storage chamber within the drum, from which is alternately introduced to the explosion space at a point opposite to that at which the working fluid is being simultaneously introduced to the aforesaid storage chamber.

The vanes are unequal in number with respect to the rotary abutments, the working fluid is caused to pass before compression around the periphery of the inner element and then alternately compressed at diametrically opposite points of the drum and stored within the said drum from which it is alternately introduced as aforesaid to the explosion chamber, the products of combustion being exhausted through ports which are at all times open to atmosphere the construction also being such as to permit of the parts being efficiently cooled by a free circulation of air induced by the rotation of the engine.

The inner normally stationary drum is provided with a duct for the working fluid passing around the periphery of said drum, ports in said periphery communicating with said duct and with the annular working chamber, storage chambers in said drum for the compressed working fluid, said storage chambers having ports opening on the periphery of the drum, ports and ducts in the outer casing for transferring the compressed working fluid from the annular working chamber of the engine to said storage chambers and from said storage chambers to the annular working chamber, and exhaust ports and passages in the drum which are at all times open to atmosphere.

The invention also comprises the details of construction and arrangement of parts all as more particularly hereinafter described and finally pointed out in the claims.

In the accompanying drawings:—

Figure 2:
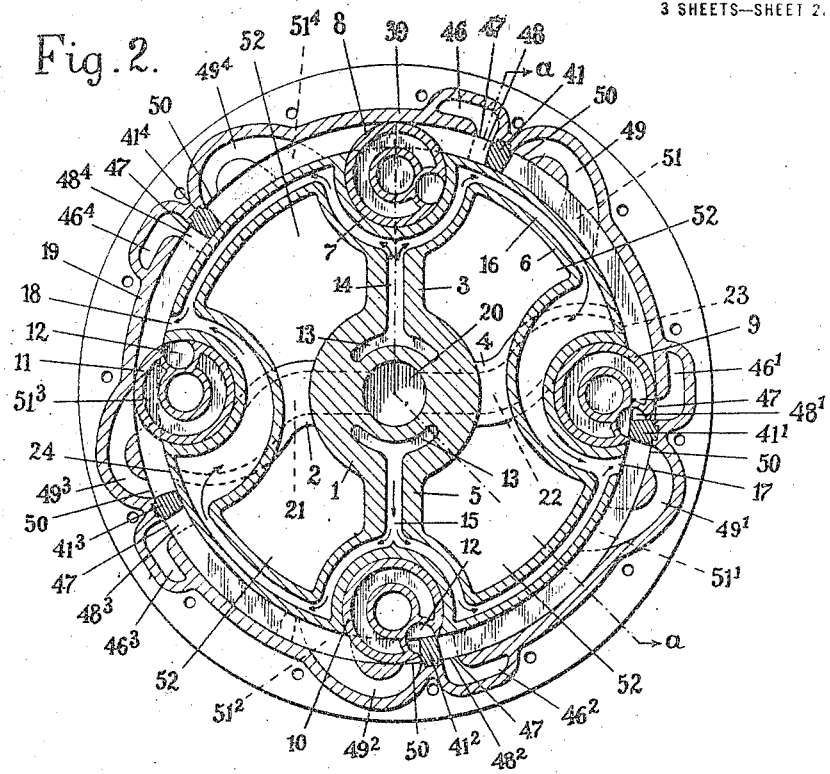

Figure 1 represents a vertical section of an internal combustion rotary engine embodying my invention taken along the line $a$—$a$ of Fig. 2.

Fig. 2. is a section taken along line $b$—$b$ of Fig. 1 and representing more or less diagrammatically the induction passages and ports.

Figure 3:
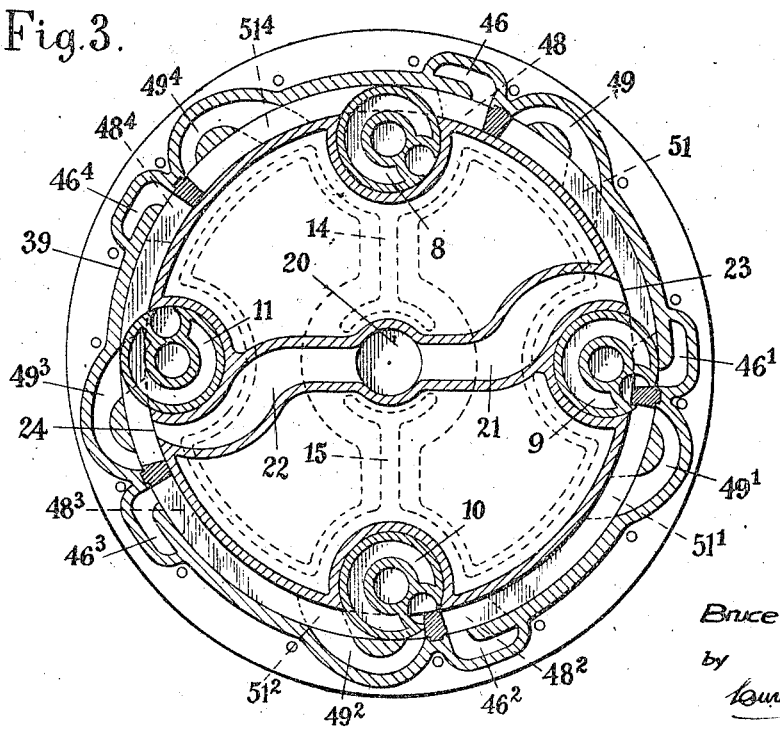

Fig. 3. represents also diagrammatically, a section on line $c$—$c$ of Fig. 1 showing the exhaust passages and ports.

Figure 4:
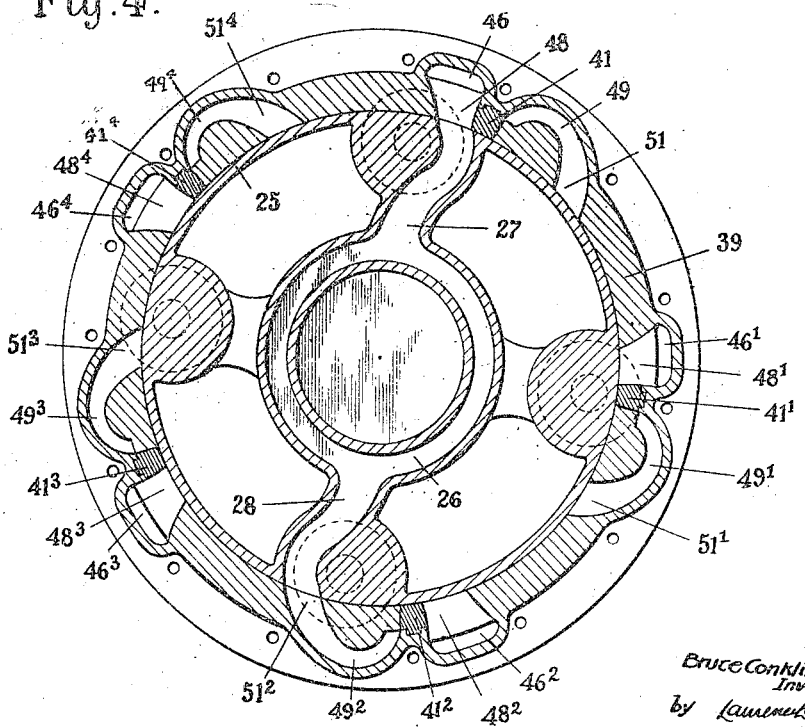

Fig. 4. represents a section on line $d$—$d$ of Fig. 1 illustrating diagrammatically the disposition of one of the compression chambers and the passages and ports communicating therewith.

Figure 5:
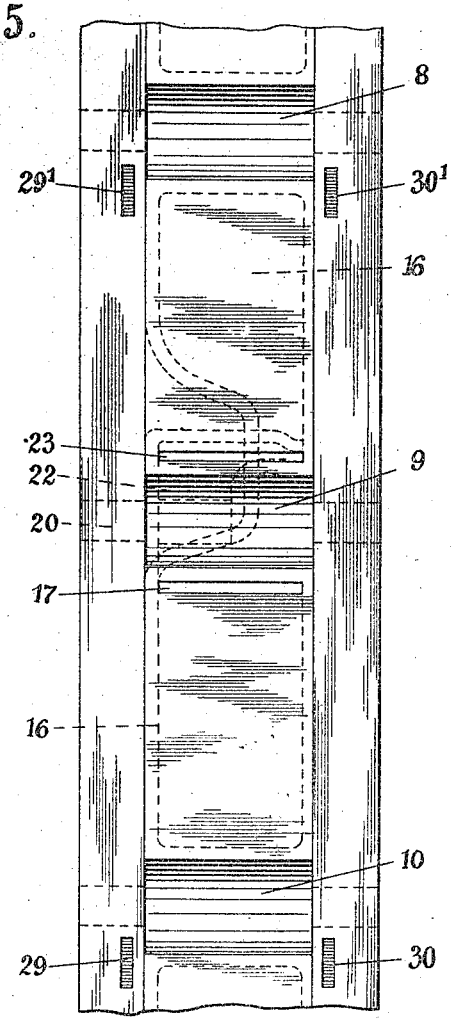

Fig. 5. is a development of a portion of the periphery of the drum looking toward the right hand side of Fig. 2.

Figure 6:
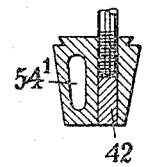

Fig. 6. is a section drawn to a larger scale through one of the vanes and

Figure 7:
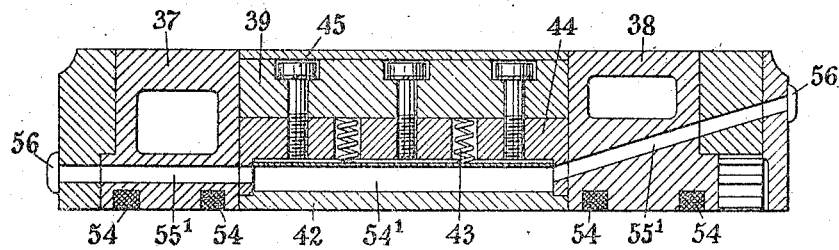

Fig. 7. is a transverse section through one of the vanes and the portion of the outer casing adjacent thereto, illustrating the means employed for cooling the vanes.

In that embodiment of the invention illustrated, the inner normally stationary, element or drum is what may be termed of skeleton or wheel-like formation, comprising a central boss 1 (see Fig. 2) connected by spoke-like members 2, 3, 4 and 5 with the rim or periphery 6. The drum is provided with pockets 7 to accommodate the rotary abutments, 8, 9, 10, and 11, of which, in the construction shown there are four arranged at an angle of 90° to each other, and each rotary abutment is formed with a pocket or recess 12 to allow the vanes carried by the outer rotating casing to pass said rotary abutments as hereinafter more fully explained.

The boss 1 is provided with longitudinal ducts 13 serving for the admission of the combustible mixture, said ducts communicating by means of the passages 14 and 15 in the spokes 3 and 5 with a duct 16 which, as will be seen on reference to Fig. 2 passes completely around the periphery 6 of the drum and communicates by means of the induction ports 17 and 18 with the annular working chamber 19 of the engine. The boss 1 is also provided longitudinally with a central duct or passage 20, communicating by ducts 21 and 22 in the spokes 2 and 4 with the exhaust ports 23 and 24 formed in the periphery 6 of the drum.

Positively secured to each side of the drum above described, so as to form part thereof, is a plate 25 (see Figs. 1 and 4), in which is formed an annular chamber 26 communicating by means of the ducts 27, 28 with ports 29 30 and 29' 30' (see Fig. 5) in the periphery of said plates 25.

The stationary inner element or drum thus constituted is supported in bearings 31 and 32, and rotatably mounted thereon by means of the antifriction bearings 33 is the outer casing, comprising two heads or end shields 34, 35 of wheel-like formation, an internally toothed ring 36 two ring shaped members 37, 38 and an annular wall 39 assembled and bolted together by bolts 40.

The annular wall 39 carries five vanes 41, $41^1$, $41^2$, $41^3$, $41^4$, (see Fig. 2) making gas tight contact with the smooth periphery of the inner drum, to which end I provide said vanes with a packing strip 42 (see Figs. 6 and 7) pressed inwardly by springs 43 nesting within the portion 44 of the vane attached to the annular wall 39 by means of the bolts 45.

The annular wall 39 is provided with a number of elongated ports 46, $46^1$, $46^2$, $46^3$, $46^4$, (Figs. 1 and 2) opening into the annular working chamber 19 at 47 and communicating with ducts 48, $48^1$, $48^2$, $48^3$, and $48^4$ in the members 37 and 38, which ducts, during the rotation of the outer casing, register with the ports, 29, 30 and $29^1$, $30^1$ in the inner stationary drum.

The annular wall 39 is also provided with a second series of elongated ports 49, $49^1$, $49^2$, $49^3$, $49^4$, opening into the working chamber 19 at 50 (Fig. 2) and communicating with ducts 51, $51^1$, $51^2$, $51^3$, $51^4$ in the members 37 and 38 similar to the ducts 48 to $48^4$ said ducts 51 to $51^4$ being also adapted to register with the ports 29, 30, and $29^1$ $30^1$ in the stationary drum during rotation of the outer casing.

In order to avoid leakage taking place between the rotating parts, I provide packing or piston rings 54 in the outer casing adapted to make contact with the periphery of the drum, and similar packing rings 55 may also be located between the lateral portions in contact of the drum and the rotating casing.

As hereinbefore stated the problem of insuring that all the parts of an internal combustion rotary engine should be efficiently cooled has presented much difficulty in practice and I therefore attach considerable importance to those features of the present invention which I will now proceed to describe and which are designed to obviate the troubles arising from overheating.

As is well known the gaseous mixture usually employed in internal combustion engines, and composed of vaporized gasolene and atmospheric air, when it issues from the carbureter is at a low temperature and I utilize this physical condition of the combustible mixture as one means of assisting to maintain the parts of my improved rotary engine at the desired low temperature. To this end I have provided the aforesaid duct 16 around the periphery of the inner drum, so that the combustible mixture passing therethrough before compression on its way to the working chamber 19 where it is compressed, operates to cool the drum, and also the vanes as they suck in each working charge.

It will further be observed that, owing to the wheel like construction of the engine as a whole, apertures 52 (Fig. 2) are formed which extend from side to side thereof, and I provide the heads or end shields 34, 35 with radial ribs 53 which, during rotation of the outer casing, causes air to be forced through the apertures 52 thereby further assisting in keeping the drum cool.

The means I employ for cooling the vanes 41, $41^4$ is also a feature of considerable importance, and I will now describe the same for the ready understanding of which reference should be had to Figs. 6 and 7. Each vane is provided with a transverse bore or duct $54^1$ communicating with ducts $55^1$ in the walls of the outer casing and opening to atmosphere, a small lip 56 being provided on the outer casing behind the openings to catch and conduct the air through the ducts $55^1$ and the ducts $54^1$ in the vanes as the outer casing rotates.

Lubrication of the engine is effected by providing oil ducts 56¹ whereby a suitable lubricant may be distributed to the gears and to the bearings, and to the face of the rotary abutments and thence to the working chamber.

I will now describe the operation of an engine embodying my invention, it being first premised that the inner element or drum is stationary, and the outer element or casing rotating in a clockwise direction and it must be assumed that the engine has been turned over a few revolutions to fill the compression chambers 26 and the ducts 27, 28 with working fluid under pressure as will presently be apparent.

Referring to Fig. 2 the vane 41 is in the firing and exhaust position, vane 41¹ is about to commence its induction and compression phase, vane 41² has completed its induction and compression phase, vane 41³ has nearly finished its power impulse and exhaust phase, and vane 41⁴, is in the induction and compression phase.

In these conditions, the combustible mixture entering through the ducts 13 passes by way of the passages 14 and 15 to the duct 16, as indicated by the arrow in Fig. 2 and it will be seen that the vane 41² has sucked a charge of combustible mixture through the induction port 17 in the drum into the annular working chamber 19, while the vane 41⁴ is drawing a charge of working fluid through the induction port 18 into the working chamber 19 and compressing a charge of working fluid previously drawn in by the vane 41 against the rotary abutment 8. Now as the vane 41¹ moves forward, the working charge in front thereof will be compressed against the rotary abutment 10, until the duct 51¹ of the elongated port 49¹ registers with the ports 29 and 30 in the drum, whereupon the mixture under compression will pass through the opening 50, elongated port 49¹ ducts 51¹ ports 29 and 30, ducts 28 to the annular compression chambers 26 (see Fig. 4). Now as the vane 41¹ passes into the pocket 12 of the rotary abutment 10, and travels to the opposite side of said abutment, the ducts 48¹ will register with the ports 29, 30, and the mixture under compression will pass from the compression chambers 26, through ducts 28, ports 29, 30 ducts 48¹ elongated port 46¹ opening 47 to the working chamber 19 behind the vane 41¹ and between it and the rotary abutment 10. When the vane reaches the position indicated in dotted lines at the bottom of Fig. 2 the ports 29 and 30 will have been closed by the outer casing as it moves over them, and at this instant the explosive mixture is fired, such as by means of the usual sparking plug, and the expansion due to combustion drives the vane forward. During this movement the products of combustion from the previous charge are being expelled through the exhaust port 34, duct 22, and centrally disposed passage 20 to the atmosphere, or the usual exhaust pipe.

While this cycle of operation is being effected, the vane 41⁴ will have compressed the charge of working fluid in front of it against the rotary abutment 8 and transferred it in exactly similar manner to that described with reference to the vane 41¹ to the compression chambers 26, and when said vane 41⁴ reaches the position 41, a charge of working fluid will be admitted from the chambers 26, through ducts 27, and ports 29¹ and 30¹ to the firing space and fired as above explained.

It should be observed that the disposition of the various ducts and ports is such that, as any one of the ducts 51, 51⁴ register with the ports 29, 30 to admit the compressed working fluid to the chambers 26, one of the ducts 48—48⁴ will be in register with the ports 29¹ 30¹ on the opposite side of the drum to admit a charge of working fluid to the explosion space behind a vane and since the same quantity of compressed working fluid is being simultaneously introduced to and abstracted from the chambers 26 there will be merely a displacement of working fluid in said chambers, for on consideration it will be seen that as one of the vanes say 41² approaches the end of its compression stroke, the space in which the compressed fluid is contained will be constantly reduced in area during the period for which the ducts 51² are in register with the ports 29, 30 in the drum, and the compressed fluid will be forced into the storage chambers 26.

As this occurs the ducts 48 will be in register with the ports 29¹ 30¹ at the opposite side of the drum, and as the vane 41 moves away from the rotary abutment 8 the area of the firing space will be constantly increased while the ducts and ports are in register, so that the same quantity of fluid will be displaced by the incoming charge as is introduced into the firing space, so that when once the contents of said chambers are at full working pressure, as will happen after a few revolutions of the outer casing, there will be a constant quantity of compressed working fluid at practically constant pressure in said chambers.

The proper timing of the rotary abutments with respect to the vanes is obtained by means of the internally toothed ring 36, which forms part of the rotating casing engaging with a gear 57 keyed to the shaft of each of the rotary abutments.

The rotary abutments 8 and 10 constitute what may be termed the compression and firing abutments since it is at these points that the combustible mixture is admitted to the compression chambers 26 and also abstracted therefrom and fired, each time each of the five vanes pass them while the abutments 9 and 11 may be termed the induction and exhaust abutments since these two phases occur each time each of the vanes passes them.

Since there are two firing abutments and five vanes in the construction hereinbefore described and illustrated by the drawings there will be ten power impulses or working strokes for each revolution of the outer casing, but it will of course be apparent that, by increasing the number of rotary abutments and vanes while maintaining the same ratio of vanes with respect to abutments any desired number of power impulses per revolution may be obtained within such limits as may be prescribed by practical considerations.

A significant feature of the operation of an engine embodying my invention is that, by effecting the firing strokes alternately at opposite sides of the engine, or in other words alternately at diametrically opposite points of the inner drum, the turning moment is very much evened up, and moreover as the ports and ducts, and the vanes and abutments are so disposed that, just before the expansion due to one explosive charge is finished another explosive charge is fired, a very evenly balanced continuous turning movement is obtained.

It will be seen that by my invention I have provided a simple and compact internal combustion rotary engine composed of but few parts and which is devoid of any positively actuated valve mechanism, while the skeleton or wheel-like formation of the engine as a whole enables me to utilize to the best advantage the currents of air induced by the rotation of the outer casing to the end of maintaining the working parts at the comparatively low temperature necessary to insure efficient and economical running.

While I have described the preferred construction of parts and the operation thereof I am aware that numerous changes of construction and operation may be made without departing from the spirit and scope of the invention, and I therefore do not wish to be understood as limiting the scope of my claims by the positive terms employed in connection with the description. What I claim and desire to secure by Letters Patent of the United States is:—

1. An internal combustion rotary engine comprising an inner stationary drum and an outer rotating casing the drum having a plurality of rotary abutments and the casing a plurality of fixed vanes the intervening annular space constituting the working chamber of the engine, means for conducting the working fluid before compression around the periphery of the drum, means for effecting the compression of the working fluid alternately at diametrically opposite points of the stationary drum and the firing of the compressed working fluid also at diametrically opposite points of the said drum.

2. An internal combustion rotary engine comprising an inner stationary drum provided with rotary abutments and an outer rotating casing provided with vanes and the said drum and casing, spaced apart so as to constitute an annular combustion or working chamber, for conducting the working fluid before compression around the periphery of the drum means for compressing the said fluid alternately at diametrically opposite points of said drum compression chambers in said drum for receiving the said fluid after compression means for conducting the compressed fluid from the compression chambers to the explosion (working) chambers and firing same alternately at diametrically opposite sides of said chambers.

3. An internal combustion rotary engine in which an inner stationary drum is provided with rotary abutments and an outer rotating casing is provided with fixed vanes the vanes being of unequal number relatively to the abutments and the said drum and casing being spaced apart so as to constitute an intervening annular working chamber means for causing the working fluid to pass before compression around the periphery of the drum means for alternately compressing the said fluid at diametrically opposite points of said drum, compression chambers in said drum means for passing the said compressed fluid thereto means for introducing the said compressed fluid from said chambers to the said explosion chamber at a point opposite to that at which the said fluid is being introduced to the compression chamber ports at all times open to the atmosphere for exhausting the products of combustion from the aforesaid explosion chamber and means for efficiently cooling the parts of the engine by free circulation of air induced by the rotation of the engine.

4. An internal combustion rotary engine in which an inner stationary drum is provided with rotary abutments and an outer rotating casing is provided with fixed vanes the vanes being of unequal number relatively to the abutments and the said drum and casing being spaced apart so as to constitute an intervening annular working chamber a peripheral duct in said inner stationary drum ports in the periphery of said drum communicating with the peripheral duct and with the annular working chamber storage chambers in said drum for receiving the fluid compressed in the annular working chamber ports in said compression chambers opening on the periphery of said drum at diametrically opposite points thereof ports and ducts in the outer casing for transferring the compressed working fluid from the annular working chamber to the compression chambers and ports and ducts in the said outer casing for transferring the compressed working fluid from the compression chambers to the annular working chamber and ports and passages in the stationary drum at all times open to the atmosphere for exhausting the products of combustion from the said combustion or working chamber of the engine.

5. An internal combustion rotary engine in which an inner stationary drum is provided with rotary abutments and an outer rotating casing is provided with fixed vanes the vanes being of unequal number relatively to the abutments and the said drum and casing being spaced apart so as to constitute an intervening annular working chamber and means for utilizing the combustible mixture or working fluid before compression to assist in cooling the engine said means comprising ducts in the axial line of the boss of the drum radial passages in the spokes of said drum distributing arcuate passages from said radial passages a peripheral duct in said drum ports in the drum communicating with the aforesaid annular working chamber annular compression chambers in the stationary drum and ports and ducts in the outer casing for conducting the compressed working fluid from the working chamber to the said compression chambers in the drum.

6. An internal combustion rotary engine in which an inner stationary drum is provided with rotary abutments and an outer rotating casing is provided with fixed vanes the vanes being of unequal number relatively to the abutments and the said drum and casing being spaced apart so as to constitute an intervening annular working chamber and means for efficiently cooling the parts of the engine said means comprising spokes in the inner stationary drum and outer rotating casing and radial ribs on the outer casing whereby air is forced through the apertures formed by the spokes and which extend from side to side of the engine.

7. In an internal combustion rotary engine in which an inner stationary drum is provided with rotary abutments and an outer rotating casing is provided with fixed vanes the vanes being of unequal number relatively to the abutments and the said drum and casing being spaced apart so as to constitute an intervening annular working chamber and means for cooling said vanes during the working of the engine said means comprising a transverse bore or duct in said vanes and ducts in the walls of the outer rotating casing communicating with the said ducts in the vanes and with the atmosphere and lips on the exterior of the walls of the outer casing behind the ducts therein to arrest and conduct the air through the ducts in the wall and through the transverse bore or duct in the vanes as the said outer casing rotates in the working of the engine.

BRUCE CONKLIN.